US008938751B2

(12) United States Patent
Jacobs

(10) Patent No.: US 8,938,751 B2
(45) Date of Patent: Jan. 20, 2015

(54) METHOD AND SYSTEM FOR PLACING INSERTS INTO A BROADCAST TELEVISION SIGNAL

(75) Inventor: Mitch C. Jacobs, Rancho Palos Verdes, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 1482 days.

(21) Appl. No.: 11/852,915

(22) Filed: Sep. 10, 2007

(65) Prior Publication Data
US 2009/0070807 A1 Mar. 12, 2009

(51) Int. Cl.
| | |
|---|---|
| H04N 7/10 | (2006.01) |
| H04N 7/16 | (2011.01) |
| H04H 20/10 | (2008.01) |
| H04H 60/06 | (2008.01) |
| H04N 21/2187 | (2011.01) |
| H04N 21/234 | (2011.01) |
| H04N 21/262 | (2011.01) |
| H04N 21/61 | (2011.01) |
| H04N 21/81 | (2011.01) |
| H04H 20/74 | (2008.01) |

(52) U.S. Cl.
CPC ............. *H04N 7/165* (2013.01); *H04H 20/103* (2013.01); *H04H 60/06* (2013.01); *H04N 21/2187* (2013.01); *H04N 21/23424* (2013.01); *H04N 21/26241* (2013.01); *H04N 21/6112* (2013.01); *H04N 21/812* (2013.01); *H04H 20/74* (2013.01)
USPC .............................................. 725/32; 725/36

(58) Field of Classification Search
USPC .................................... 725/32, 36
See application file for complete search history.

(56) References Cited

U.S. PATENT DOCUMENTS

| | | | |
|---|---|---|---|
| 5,646,675 A | 7/1997 | Copriviza et al. | |
| 5,826,165 A | 10/1998 | Echeita et al. | |
| 6,173,312 B1 | 1/2001 | Atarashi et al. | |
| 6,286,045 B1 | 9/2001 | Griffiths et al. | |
| 7,222,155 B1 | 5/2007 | Gebhardt et al. | |
| 7,228,341 B2* | 6/2007 | Giacalone, Jr. ................ | 709/218 |
| 7,500,258 B1* | 3/2009 | Eldering ......................... | 725/32 |
| 7,665,117 B2 | 2/2010 | Sequeira | |
| 7,689,510 B2 | 3/2010 | Lamkin et al. | |
| 7,941,564 B2 | 5/2011 | Gebhardt et al. | |
| 2002/0083439 A1 | 6/2002 | Eldering | |
| 2002/0149617 A1* | 10/2002 | Becker .......................... | 345/751 |
| 2003/0004793 A1 | 1/2003 | Feuer et al. | |
| 2003/0023970 A1* | 1/2003 | Panabaker ..................... | 725/32 |
| 2003/0070167 A1 | 4/2003 | Holtz et al. | |
| 2003/0084441 A1* | 5/2003 | Hunt .............................. | 725/32 |
| 2003/0200128 A1 | 10/2003 | Doherty | |
| 2004/0093394 A1* | 5/2004 | Weber et al. .................. | 709/219 |
| 2004/0216161 A1 | 10/2004 | Barone et al. | |
| 2005/0149968 A1 | 7/2005 | Konig et al. | |

(Continued)

*Primary Examiner* — Nasser Goodarzi
*Assistant Examiner* — Michael Hong

(57) ABSTRACT

A system and method includes a content repository storing insert material therein and a scheduling system assigning an insert material identification to the insert material and generating an insertion schedule having an insertion time corresponding to the insert material identification. The system also includes an automation server in communication with the scheduling system. The automation server receives the insertion schedule, retrieves the insertion material from the content repository, stores the content therein in response to the insertion time, receives a content signal with a trigger and inserts the insert material into the content signal in response to the trigger and the trigger time to form a modified content signal.

24 Claims, 9 Drawing Sheets

(56) References Cited

U.S. PATENT DOCUMENTS

| | | | |
|---|---|---|---|
| 2006/0075449 A1 * | 4/2006 | Jagadeesan et al. | 725/113 |
| 2006/0195863 A1 | 8/2006 | Whymark | |
| 2008/0165789 A1 | 7/2008 | Ansari et al. | |

* cited by examiner

METHOD AND SYSTEM FOR PLACING INSERTS INTO A BROADCAST TELEVISION SIGNAL

TECHNICAL FIELD

The present disclosure relates generally to television broadcasting, and more particularly to a method and apparatus for inserting inserts such as advertising into the broadcast television signal.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers. Providing reliable signals reduces the overall cost of the system by reducing the number of received calls at a customer call center.

Television providers often insert promotional material or commercials into various portions of a program. For cable television provider this is done locally. Oftentimes, this is a manual process. Providing a convenient and reliable method is desirable.

SUMMARY

The present disclosure provides a means for insert and monitoring channel signals and inserting insertion material into a channel stream. The means is suitable for many types of systems including satellite television systems.

In one aspect of the disclosure, a method includes storing insert material in a content repository, assigning an insert material identification to the insert material, generating an insertion schedule having an insertion time corresponding to the insert material identification, communicating the insertion schedule to the automation server, retrieving the insertion material from the content repository and storing the content in the automation system prior the insertion time, communicating a content signal with a trigger and inserting the insert material into the content signal in response to the trigger and the trigger time to form a modified content signal.

In yet another aspect of the disclosure, a system includes a content repository storing insert material therein and a scheduling system assigning an insert material identification to the insert material and generating an insertion schedule having an insertion time corresponding to the insert material identification. The system also includes an automation server in communication with the scheduling system. The automation server receives the insertion schedule, retrieves the insertion material from the content repository, stores the content therein in response to the insertion time, receives a content signal with a trigger and inserts the insert material into the content signal in response to the trigger and the trigger time to form a modified content signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
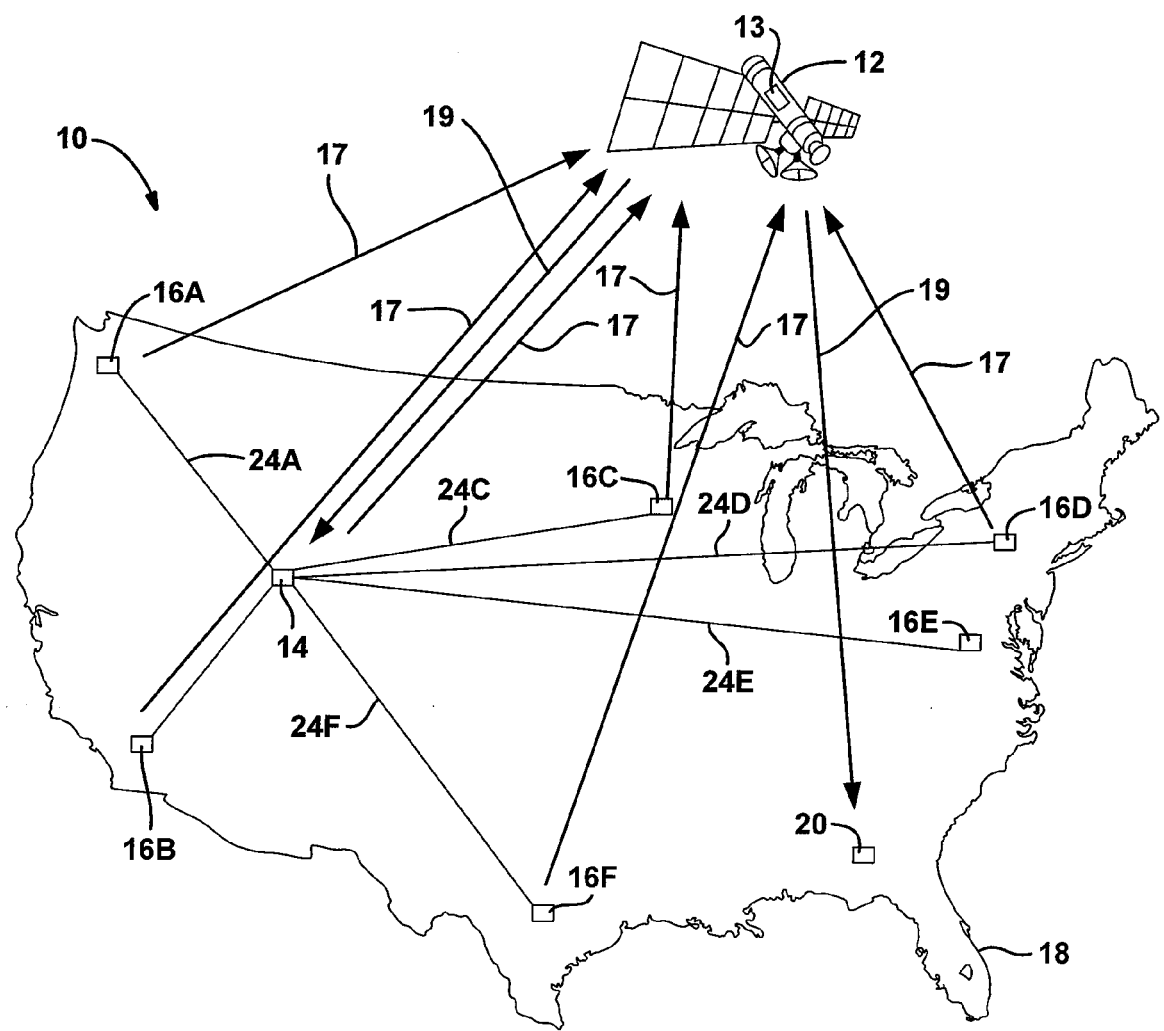
FIG. 1 is an overall system view of a satellite communication system in the continental United States.

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is described with respect to a satellite television system. However, the present disclosure may have various uses including satellite transmission and data transmission and reception for home or business uses. The system may also be used in a cable system or wireless terrestrial communication system for generating an output signal.

Referring now to FIG. 1, a communication system 10 includes a satellite 12 that includes at least one transponder 13. Typically, multiple transponders are in a satellite. The communication system 10 includes a central facility 14 and a plurality of regional facilities 16A, 16B, 16C, 16D, 16E and 16F. Although only one satellite is shown, more than one is possible. The regional facilities 16A-16F may be located at various locations throughout a landmass 18 such as the continental United States, including more or less than those illustrated. The regional facilities 16A-16F uplink various uplink signals 17 to satellite 12. The satellites downlink downlink signals 19 to various users 20 that may be located in different areas of the landmass 18. The users 20 may be mobile or fixed users. The uplink signals 17 may be digital signals such as digital television signals or digital data signals. The digital television signals may be high definition television signals. Uplinking may be performed at various frequencies including Ka band. The present disclosure, however, is not limited to Ka band. However, Ka band is a suitable frequency example used throughout this disclosure. The central facility 14 may also receive downlink signals 19 corresponding to the uplink signals 17 from the various regional facilities and from itself for monitoring purposes. The central facility 14 may monitor the quality of all the signals broadcast from the system 10.

The central facility 14 may also be coupled to the regional facilities through a network such as a computer network having associated communication lines 24A-24F. Each communication line 24A-F is associated with a respective regional site 16. Communication lines 24A-24F are terrestrial-based lines. As will be further described below, all of the functions performed at the regional facilities may be controlled centrally at the central facility 14 as long as the associated communication line 24A-F is not interrupted. When a communication line 24A-F is interrupted, each regional site 16A-F may operate autonomously so that uplink signals may continually be provided to the satellite 12. Each of the regional and central facilities includes a transmitting and receiving antenna which is not shown for simplicity in FIG. 1.

Figure 2:
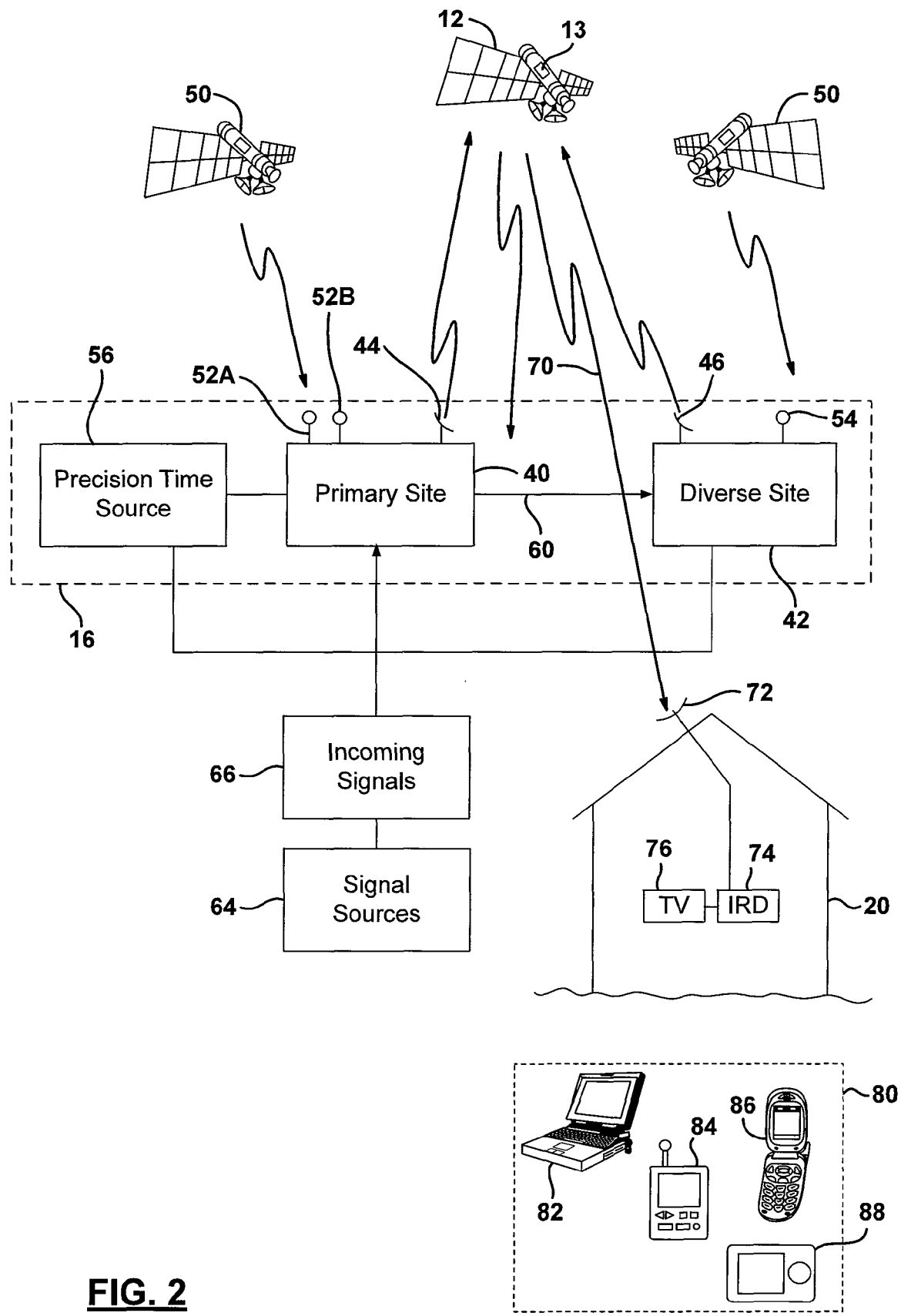
FIG. 2 is a system view at the regional level of a satellite system.

Referring now to FIG. 2, the regional facilities 16A-16F of FIG. 1 are illustrated collectively as reference numeral 16. The regional facilities 16 may actually comprise two facilities that include a primary site 40 and a diverse site 42. The primary site 40 may be referred to as a primary broadcast center (PBC). As will be described below, the central site 14 may also include a primary site and diverse site as is set forth herein. The primary site 40 and diverse site 42 of both the central and regional sites may be separated by at least 25 miles, or, more even more such as, at least 40 miles. In one constructed embodiment, 50 miles was used. The primary site 40 includes a first antenna 44 for transmitting and receiving signals to and from satellite 12. Diverse site 42 also includes an antenna 46 for transmitting and receiving signals from satellite 12.

Primary site 40 and diverse site 42 may also receive signals from GPS satellites 50. GPS satellites 50 generate signals corresponding to the location and a precision timed signal that may be provided to the primary site 40 through an antenna 52 and to the diverse site 42 through an antenna 54. It should be noted that redundant GPS antennas (52A,B) for each site may be provided. In some configurations, antennas 44 and 46 may also be used to receive GPS signals.

A precision time source 56 may also be coupled to the primary site 40 and to the diverse site 42 for providing a precision time source. The precision time source 56 may include various sources such as coupling to a central atomic clock. The precision time source may be used to trigger certain events such as advertising insertions and the like.

The primary site 40 and the diverse site 42 may be coupled through a communication line 60. Communication line 60 may be a dedicated communication line. The primary site 40 and the diverse site 42 may communicate over the communication line using a video over internet protocol (IP).

Various signal sources 64 such as an optical fiber line, copper line or satellites may provide incoming signals 66 from the primary site 40 to the diverse site 42. Incoming signal 66, as mentioned above, may be television signals. The television signals may be high-definition signals. The incoming signals 66 such as the television signal may be routed from the primary site 40 through the communication line 60 to the diverse site 42 in the event of a switchover whether the switchover is manual or a weather-related automatic switchover. A manual switchover, for example, may be used during a maintenance condition.

In a terrestrial system, the satellites may be eliminated, used or replaced by transmission towers that use terrestrial antennas in place of antennas 46. In a cable system, the antennas 46 may be replaced with optical fibers or copper wires.

Users 20 receive downlink signals 70 corresponding to the television signals. Users 20 may include home-based systems or business-based systems. As illustrated, a user 20 has a receiving antenna 72 coupled to an integrated receiver decoder (IRD) 74 that processes the signals and generates audio and video signals corresponding to the received downlink signal 70 for display on the television or monitor 76. It should also be noted that satellite radio receiving systems may also be used in place of the IRD 74. The integrated receiver decoder may be incorporated into or may be referred to as a set top box.

The user 20 may also be a mobile user. The user 20 may therefore be implemented in a mobile device or portable device. The portable device 80 may include but are not limited to various types of devices such as a laptop computer 82, a personal digital assistant 84, a cellular telephone 86 or a portable media player 88.

Figure 3A:
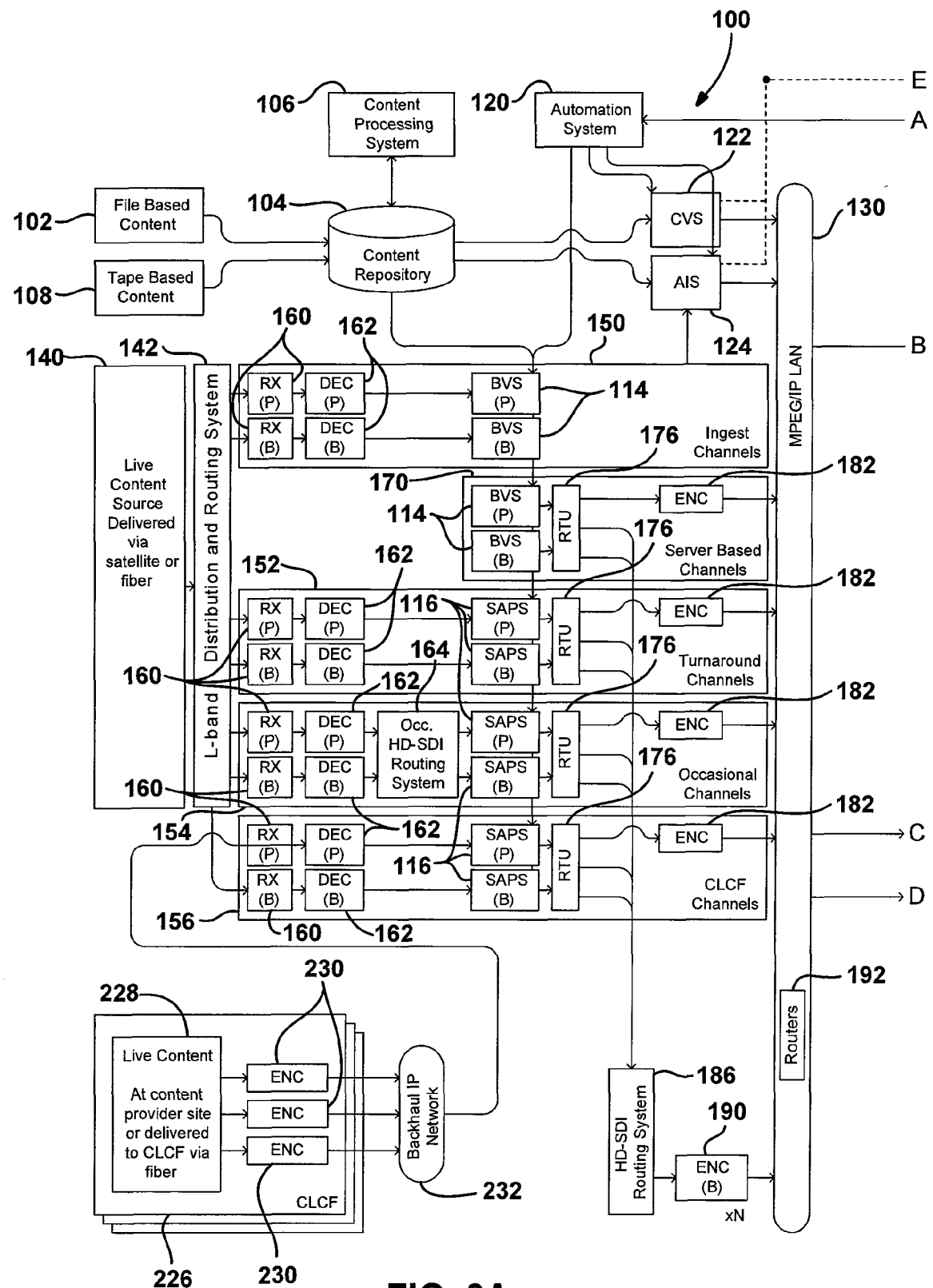
FIGS. 3A and 3B are a block schematic view of the system illustrated in FIGS. 1 and 2.
Figure 3B:
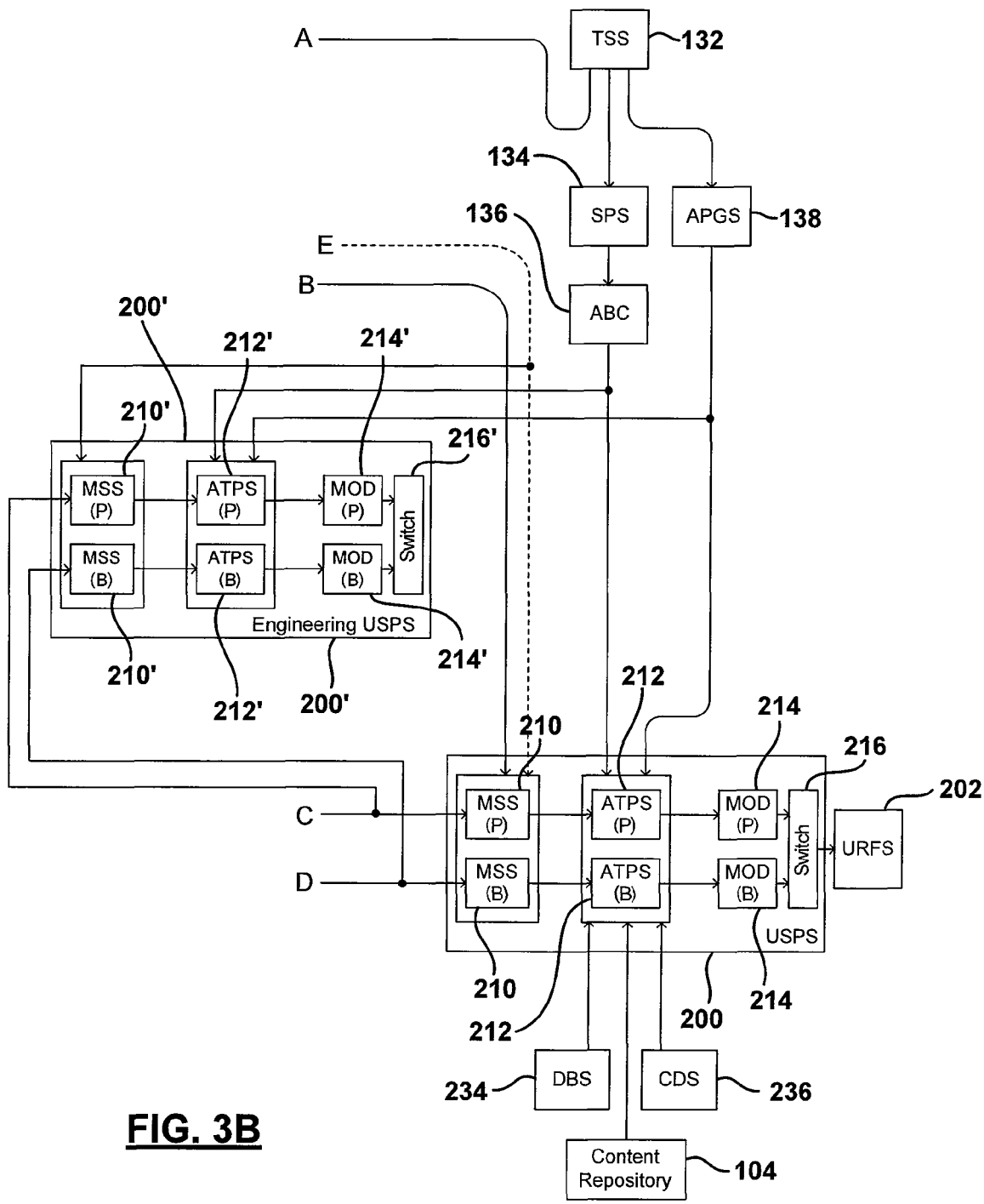

Referring now to FIGS. 3A and 3B, a ground segment system 100 for processing content and forming an output signal is illustrated. One method for providing content is using file-based content 102. The file-based content 102 may be in various standard formats such as CableLabs® content, digital video disks or the like. The file-based content 102 is provided to a content repository 104 that stores the various file-based content. If needed, a content processing system 106 processes the content and converts the format of the file-based content. The content processing system 106 may convert the video compression format, the resolution, the audio compression format and audio bit rates to match the target broadcast path. The content from the content repository 104 may be provided to various systems as will be described below. The content repository 104 may also receive tape-based content 108. The tape-based content 108 may be processed in the content processing system 106 into various formats including a first format such as high-definition, serial digital interface (HD-SDI) format. The content repository 104 may provide content to baseband video servers 114. The (P) and the (B) in the Figure denote a primary and secondary or back-up baseband video server. The content repository 104 may also provide signals to various service access processing systems 116. As illustrated, several service access processing systems (SAPS) are illustrated. Both primary and back-up service access processing systems 116 may be provided in the various chains.

An automation system 120 may control the insertion of various advertising into file-based and live streams. The SAPS 116 may function as an advertising insertion module. The SAPS 116 may also include a digital video effects insertion module described below. The function of the automation system 120 will be further described below.

Content repository 104 may also be coupled to a compressed video server (CVS) 122 and an advertising-insertion server (AIS) 124. The compressed video server 122 uses content that is retrieved from the content repository 104. The content repository 104 stores the content well in advance of use by the compressed video server 122. Likewise, advertising may be also drawn from the content repository 104. Both the content video server 122 and ad-insertion server 124 provide content in a compressed manner. This is in contrast to the baseband video server 114 that is provided content in a baseband. The output of the content video server may be in an IP transport stream. The content output of the compressed video server 122 and the ad-insertion server 124 may be provided to a local area network 130.

Figure 5:
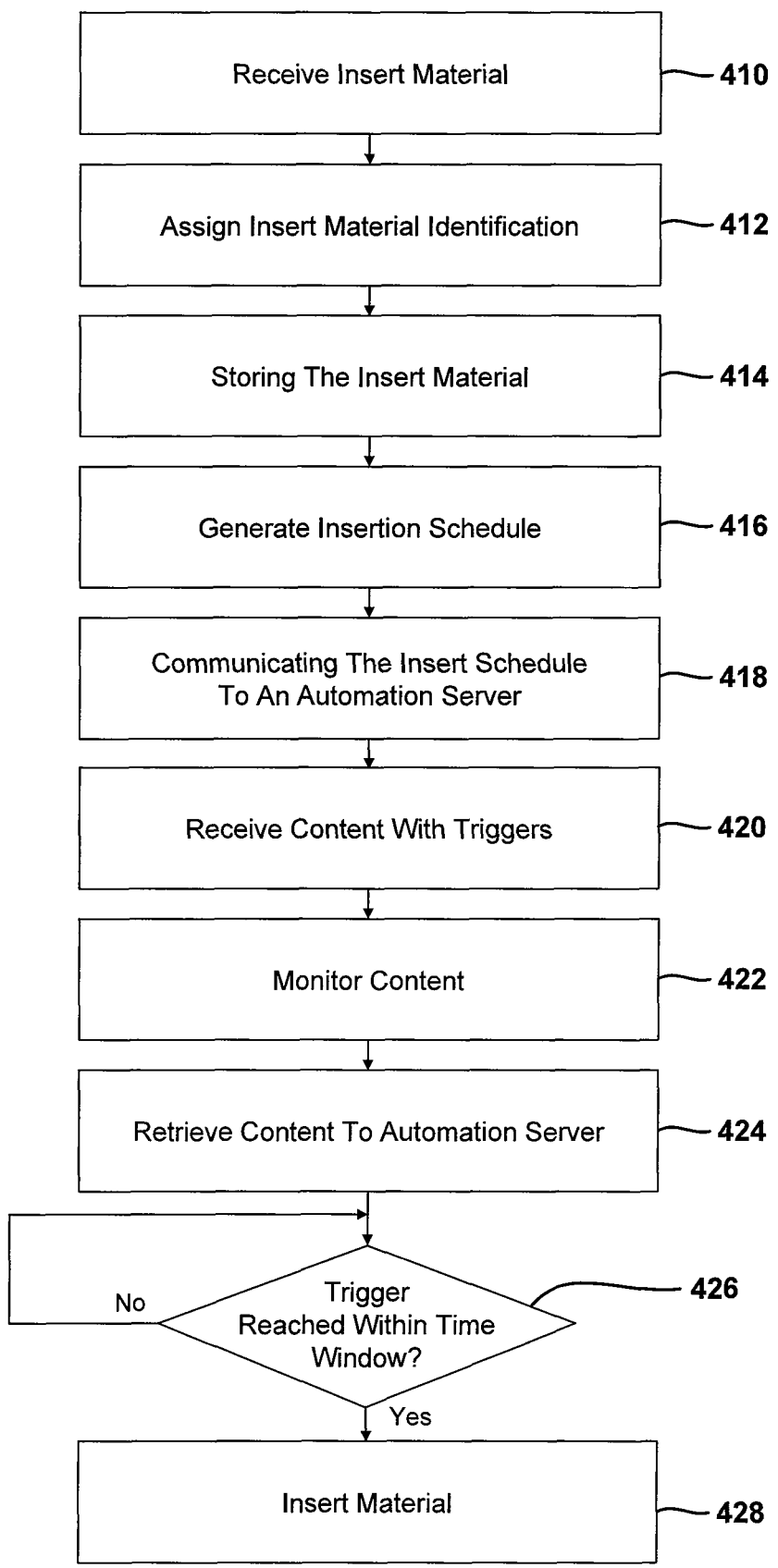
FIG. 5 is a flow chart of a method of inserting insertion material into a channel signal.

A traffic scheduling system (TSS) 132 schedules the content throughout the ground segment 100. The traffic scheduling system 132 generates broadcast schedules utilized by the baseband video servers 114, the service access processing system 116, the automation system 120, the compressed video server 122 and the ad-insertion server 124. The traffic and scheduling system 132 provides program-associated data (PAD) to a scheduled PAD server (SPS) 134. The SPS 134 delivers the program-associated data to an advanced broadcast controller (ABC) 136. As will be described below, an advanced broadcast management system (ABMS) 500 illustrated in FIG. 5 is used to monitor and control the content.

The traffic and scheduling system 132 may also be in communication with an advanced program guide system 138.

A live content source 40 delivered by way of a satellite optical fiber or copper wires couple live content to an L-band distribution and routing system 142. Of course, those skilled in the art will recognize various other frequencies may be used for the L-band. The output of the routing system 42 may be provided to ingest channels 150, turnaround channels 152, occasional channels 154, and continental United States local collection facility channels 156. Each of the various channels 150-156 may represent a number of channels. Each of the channels has primary and secondary or back-up circuitry for processing the data stream.

The output of the L-band distribution and routing system 142 provide signals to receivers 160. As mentioned above, the paths may be in primary or secondary paths. The receivers 160 receive the feed signal from the L-band distribution and routing system 142 and demodulate the feed signal. The receiver may also provide decryption. The feed signal may be in an ATSC-compliant transport stream from terrestrial fiber or satellite sources. The feed signal may also be a DVD-compliant transport stream delivered via satellite or fiber. The signal may also include a digicipher-compliant transport stream, a JPEG 2000 transport stream or various proprietary formats from various content providers. The output of the receiver may be provided via an ASI or MPEG IP interface.

Should the content from the content provider be provided in a format that can be immediately used by the system, the receiver may be replaced with a pass-through connector such as a barrel connector.

The receive signal from the receiver 160 is provided to decoders 162. The decoders 162 decode the receive signal to provide decoded signals. The receive signal may still be compressed and, thus, the decoder may be used for decoding the live compressed video and audio content. The receive signal may be an ATSC-compliant transport stream, a DVD-compliant transport stream, a digicipher-compliant transport stream, a JPEG 2000 transport stream or various proprietary formats that may be delivered via ASI or MPEG/IP. The output of the decoder is a baseband signal that may be in a variety of formats such as a high definition serial digital interface (HD-SDI) format. The decoders 162 may also include a general purpose interface used to convey add trigger events via contact closures. The input may be delivered directly from an upstream receiver, a conversion box that converts dual-tone multi-frequency tones from the upstream receiver into the general purpose interface. The audio format may carry various types of audio streams including Dolby digital, Dolby E or PCM audio. More than one type of audio stream may be included for a signal. The house signal may also include Society of Cable Telecommunication Engineers (SCTE) standard 104 and 35 messages. The house signal may also include closed captioning and vertical interval time code (VITC). It is possible that the decoder may not be required if the content provided from the live content sources is in the proper format. Therefore, the decoder is an optional piece of equipment.

For the occasional channels 154, the output of the decoders 162 may be provided to an occasional HD-SDI routing system 164. Of course, the output of the receiver 152 may be routed rather than the output of the decoder 152. An occasional channel is a live turnaround channel that only exists long enough to carry one or more events, typically sporting events such as those in the NFL or NBA. The type of receiver formatting or authorizations may vary depending on the type of event. Only a small number of receivers are used for these types of events. The routing system 164 allows a proper allocation of downstream equipment in proportion to the number of active broadcast channels rather than the number of content providers.

The output of the decoders 162 in the ingest channels 150, the turnaround channels 152, and the CONUS local collection facility channels 156 are each provided to the SAPS 116. The SAPS 116 provide baseband processing which may include conversion to a house format and ad-insertion. The SAPS 116 receives a single HD-SDI signal from each decoder 162. It is possible that the decoder and the SAPS may be combined in one unit. The service access processing system SAPS 116 may extract and reinsert various audio streams, such as PCM, Dolby digital, or Dolby E audio. The SAPS 116 may also transcode the signals in the case where a different coding scheme is required. Various operational modes may also be incorporated into the SAPS 116 including frame synchronization, error concealment, and the use of variable incoming bit rates. The SAPS 116 may also support real time changes in the video format. The video format may, for example, be 1080p, 1080i, 720p, and 480p.

Server-based channels 170 may also be included in the system. Server-based channels 170 include a baseband video server 114 that receives content from the content repository 104.

The primary and back-up baseband video servers 114 of the server-based channels 170 may be coupled to a receiver transfer unit (RTU) 176 which acts as a switch-to-switch between primary and back-up signals. The primary and back-up service access processing system of the turnaround channels 152, the occasional channels 154, and the remote collection facility channels 156 may all be coupled to a receiver transfer unit 176. The receiver transfer unit 176 performs various functions including redundancy switching or selection for choosing between the primary and the back-up outputs of the baseband video server 114 or the service access processing system 116 and providing the chosen signal to an encoder 182. The receiver transfer units 176 may also route the signals for monitoring and redundancy to an HD-SDI monitoring system 186. The receiver transfer units 176 may provide an automatic redundancy mode in which the unit fails to a back-up input upon loss of a primary input signal. The RTU 176 may also be implemented so that a switch back from the back-up to the primary unit may not be automatically performed without manual intervention. The receiver transfer unit 176 may be a switch that is controlled by the advanced broadcast management system 300 (of FIG. 5) to generate an output signal. In the case of a failure of one of the encoders 182, a routing system 186 may be used to route the signal through a back-up encoder 190.

The HD-SDI routing system 186 may provide a plurality of back-up encoders for the various channels. A number of back-up encoders may be provided based on the number of primary encoders. In one example, three back-up encoders for every primary encoder were provided.

The encoders 182 and the encoders 190 encode the video audio closed-captioned data VITC and SCTE 35 data associated within a single chain. The output of the encoder is a single program transport stream that is provided by way of an MPEG-IP interface. The single program transport stream (SPTS) is coupled to a local area network 130. The local area network 130 may include a plurality of routers 192 that are used to route the single port transport streams to an uplink signal processing system (USPS) 200. Several uplink signal processing systems 200 may be provided. This may include a secondary or back-up USPS that will be referred to as an engineering USPS 200'. The single program transport stream includes identification of the signal so that it may be properly routed to the proper uplink signal processing system. The uplink signal processing system 200 generates an output to an uplink RF system (URFS) 202 that includes a power amplifier. The uplink signal processing system 200 may also provide redundant pairs to increase the reliability of the output signal.

The uplink signal processing system 200 may include a multiplexing splicing system (MSS) 210, an advance transport processing system (ATPS) 212, and a modulator 214. Pairs of multiplexing splicing systems 210, advance transport processing systems 212, and modulators 214 may be provided for redundancy. The multiplexing splicing system 210 multiplexes the single program transport stream from the local area network 130 into a multiplexed transport stream (MPTS). The MSS 210 may also act to insert advertising into the signal. Thus, the MSS 210 acts as a multiplexing module and as an ad insertion module. Various numbers of single-program transport streams may be multiplexed. In one constructed embodiment, eight single program transport streams were multiplexed at each MSS 210. The ads to be inserted at the MSS 210 may be formatted in a particular format such as MPEG 4 format and have various types of digital including Dolby digital audio streams. The MSS 210 may identify insertion points based on SCTE 35 in the incoming stream. The advance transport processing system 212 converts the DVB-compliant transport stream from the MSS 210 into an advanced transport stream such as the DIRECTV A3 transport stream. The ATPS 212 may support either ASI or MPEG output interface for the broadcast path. Thus, the ATPS 212 acts as an encryption module. The ATPS 212 may accept data from the advanced broadcast controller 136 and the advanced program guide system 138. The ATPS 212 may also be coupled to a data broadcast system 226. The data from the ABC 136, the APGS 138, and the DBS 226 are multiplexed into the output transport stream. Thus, the ATPS 212 acts as a data encryption module. As will be described below, the ATPS may also be coupled to the advanced broadcast management system described below in FIG. 4. Error reporting to the advanced broadcast management system (300 in FIG. 5) may include transport level errors, video outages, audio outages, loss of connection from a redundancy controller or a data source, or a compression system controller.

The modulators 214 modulate the transport stream from the ATPS 212 and generate an RF signal at a frequency such as an L-band frequency.

An RF switch 216 is coupled to the primary modulator and back-up modulator 214. The RF switch provides one output signal to the uplink RF system 202.

The ATPS 212 may also receive information or data from a DBS 234. The DBS 234 provides various types of data to be inserted into the broadcast. The data information is provided to the ATPS 212 to be inserted into the program stream. A content distribution system 236 may also be used to couple information to the ATPS. The content distribution system may provide various information such as scheduling information, or the like. The content repository 104 may also be directly coupled to the ATPS for providing various types of information or data.

Referring back to the front end of the ground segment 100, a CONUS local collection facility (CLCF) 226 may be used to collect live content represented by box 228 at a content-provider site or delivered to the CLCF 226 by way of a fiber. A plurality of encoders 230 may be used to encode the signals in a useable format by the system. The encoder signals may be provided to a backhaul internet protocol network 232 and provided to a decoder 162 within the CLCF channels 156 or to a receiver 160 in the CLCF. As mentioned above, if the content is formatted in a usable format, the receiver 160 may not be required. Should the receiver function be required, a receiver may be used in the system.

Several uplink signal processing systems 200 may be provided for any one system. Each of the uplink signal processing systems may correspond to a single transponder on a single satellite. Thus, the combined single program transport streams received at the multiplex splicing system 210 are combined to fit on a single transponder.

A back-up or engineering uplink system processing system 200' may also be provided. The engineering uplink signal processing system 200' may have the same components as the USPS 200. The engineering USPS 200' may be used as a substitute for a particular transponder should one of the primary USPS fail for any reason.

Figure 4:
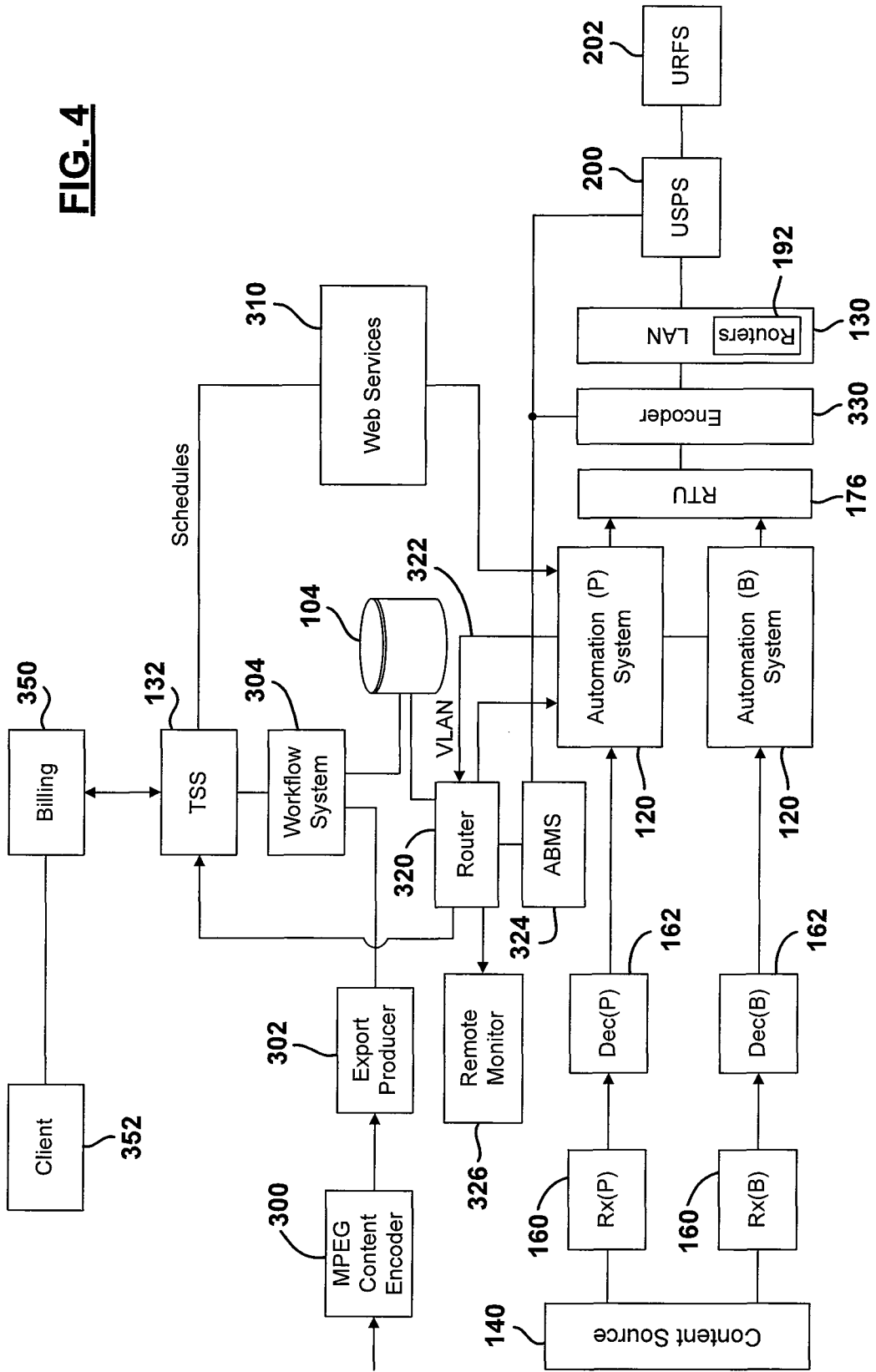
FIG. 4 is a block diagrammatic view of a second embodiment of a system illustrated in FIG. 3.

Referring now to FIG. 4, a block diagrammatic view of a triggering insertion system formed according to the present disclosure is set forth. In this embodiment, elements of FIGS. 3A and 3B are labeled the same. Also, the automation system 120 in FIG. 3 has been incorporated in the place of the baseband video server (BVS) 114 illustrated in FIG. 3A since the automation system and the BVS may function together. The system illustrated in FIG. 4 includes further details for inserting insertion material and monitoring insertion material such as commercials, promotional materials and slides. The system set forth in FIG. 4 is particularly suitable for insertion of material into live channel streams.

An encoder 300 such as an MPEG 2 encoder may be used to receive material from outside sources into an export producer 302. The export producer 302 communicates insert content such as commercial spots, slides or promotional material to a workflow system 304. The workflow system 304 communicates the content to the content repository 104 where it is stored therein. The workflow system 304 may generate an insert material identifier such as an ISCI (Industry Standard Commercial Identifier) for commercial or promotional spots. A typical ISCI identifier format includes an alphabetic identifier identifying the source and a numeric identifier identifying the spot number. The workflow system 304 may also receive content such as pay-per-view content which is assigned a material ID at the workflow system 304. The material ID and the ISCI may be assigned by the traffic scheduling system 132.

The traffic scheduling system 132 may also set schedules for insertion of various insert materials into broadcast programming. Programming or break windows may be assigned for the insertion of the insertion material. The break windows may also be manually inserted by a system operator. Thus, the schedules may include the time window and the insert material identification.

The schedules may be communicated through a web services server 310 to the automation system 120. Both the back-up and primary automation system 120 may receive the web services' command or schedule. The web services server 310 may be used to assign the automation servers to a particular channel. For example, a control channel identifier CCID may be assigned to a particular automation system 120 that has an automation system address such as "1000." Both an "a" and "b" address may be used for the primary and back-up automation systems 120.

A router 320 may be used to route various material through the system. The router 320 may be used to communicate content and insert material to the automation system 120. The automation system 120 may communicate video information through a video LAN connection (VLAN) 322 to the router 320 where it may be monitored through an advanced baseband monitoring system (ABMS) 324. The ABMS system 324 may include displays for displaying various signals and controlling various signals.

The automation system 120 may receive triggers such as a general purpose interface (GPI) trigger, a Society of Cable Telecommunications Engineers (SCTE) 104 trigger or a digital program insertion interface (DPI) trigger. Such triggers may be included in the vertical ancillary portion (VANC) data portion of the received signal. The trigger data may include metadata regarding the timing and length of the break. A pre-roll time may be included in the trigger metadata. The pre-roll time is a time corresponding to the time until a break occurs. By communicating the pre-roll time to the automation system the insert material may be retrieved and used.

A remote monitor 326 may also be coupled to the router 320. The remote monitor 326 may be used to receive monitoring signals that may be monitored from a remote site. For example, the remote monitor 326 may be located in the home of a supervisor or the like. The remote monitor, as will be further described below, may be accessed through the internet upon a proper authentication.

The above-specified system may be used for both pay-per-view and live content signal streams. In a live content signal stream, content is received through the content sources 140 and received at receiver 160. The received signals are decoded at the decoders 162 which are then provided to the automation system 120. For a pay-per-view content stream, the content is retrieved from the content repository 104 and provided to the automation system 120 without the need for receiving and decoding. As will be described below, the automation system 120 may then be used to insert insertion material into a channel signal stream. As will be described below, the monitoring system may be used to monitor the signals. The automation system 120 may be used to monitor the channel signals and the channel signals with the insertion information or insertion insert material.

The automation system 120 provides these signals through the remote transfer units 176 to the encoders 330 through the LAN 192 through the uplink signal processing system 200 and through the uplink RF system 202 which generates an uplink signal. Components 176, 192, 200 and 202 were described thoroughly above.

Referring now to FIG. 5, a method of operating the system illustrated in FIG. 4 is set forth. In this embodiment, insertion material is received at Box 410. Insert material may be received through the export producer 302 illustrated in FIG. 4.

In step 412, an insert material identification is provided. If the insert material is a commercial, the ISCI standard may be used for assigning the insert material identification prior to receiving the insert material or after receiving the insert material. In step 414, the insert material is stored in the content repository 104.

In step 416, the traffic scheduling system 132 of FIG. 4 generates an insertion schedule. As mentioned above, the insertion schedule may include a window for inserting the particular insert material based on the identification. In step 418, the insertion material is communicated to the automation server 120 of FIG. 4.

In step 420, content is received either through the receiver and decoder or from the content repository in the instance of pay-per-view. The content may include triggers that are used to trigger the insertion of the insertion material. Examples of triggers include Society of Cable Telecommunications Engineers (SCTE) 104 compliant, a digital program insertion (DPI) trigger or a general purpose interface (GPI) trigger. In step 422, the content may be monitored through the ABMS 324 or remote monitor 326 illustrated in FIG. 4.

Based upon the insert schedule in the automation server, insert material may be retrieved by the automation server and stored therein. This may be performed a certain length of time before the insert material is required for insertion into the channel stream. This may occur minutes or hours before the insert material is required. Retrieving may be performed in response to the pre-roll time in the metadata of the trigger.

In step 426, if a trigger has not been reached, the system continues to play out the channel signal. In step 426, if a trigger has been reached, the insert material is inserted in step 428.

Figure 6:
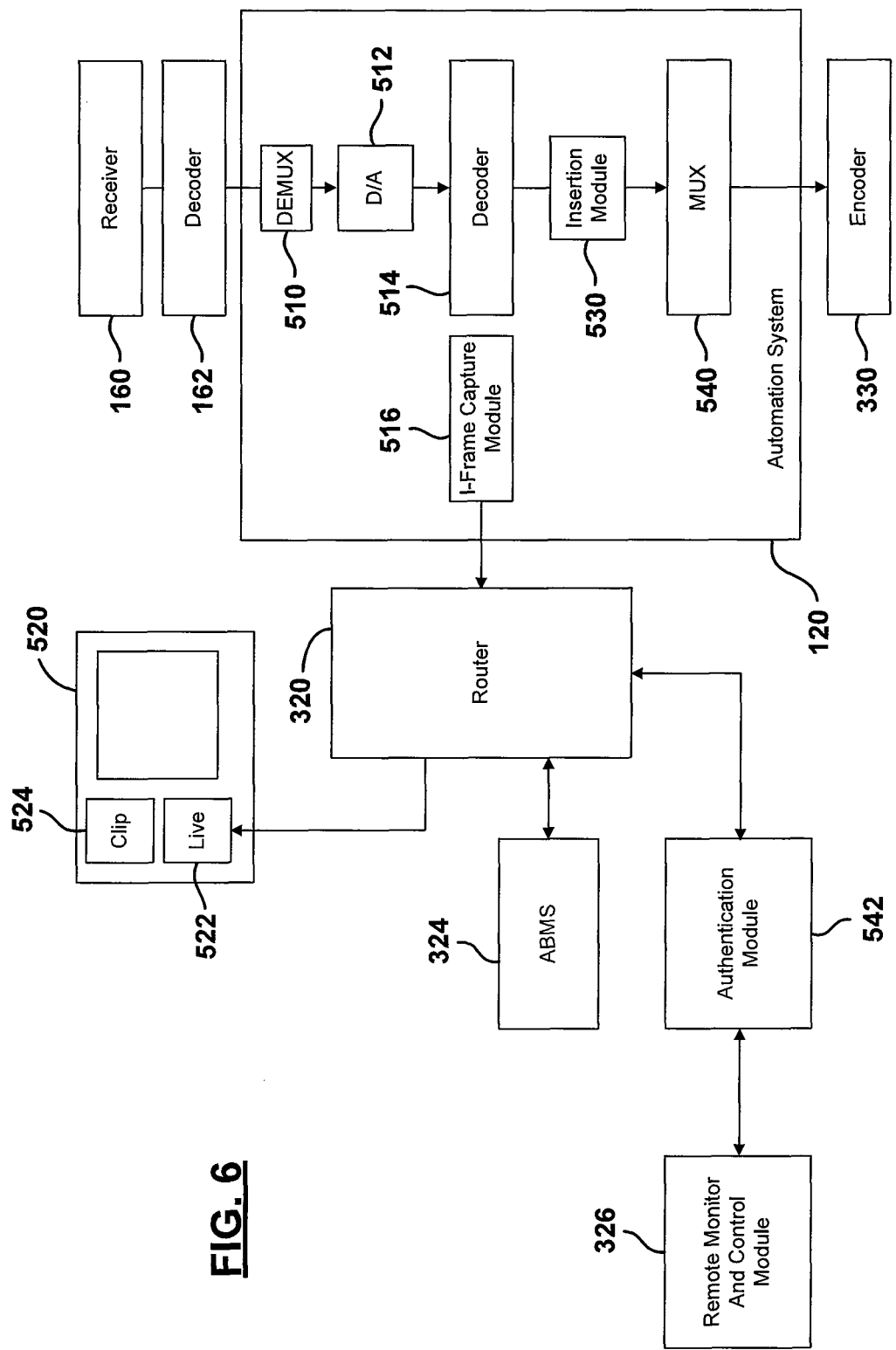
FIG. 6 is a schematic view of a first embodiment of monitoring a channel signal.

Referring now to FIG. 6, a first system for monitoring live signals is illustrated. In this configuration, the receiver 160 and the decoder 162 are common to FIG. 4. Likewise, the ABMS system 324 and the remote monitor 326 are also common. In this embodiment, one method for monitoring the live signal may be I-frame capture.

The live signal is received by the receiver 160 and the decoder 162 to form a decoded signal. The signal may then be communicated to the automation system 120 where it is demultiplexer at demultiplexer 510. The signal may also undergo a digital-to-analog conversion after the demultiplexing of the signal at the demultiplexer 510. The digital-to-analog conversion may be used since the signal from the decoder 162 may be a serial digital interface signal. More specifically, the signal from the decoder may be a high-definition serial digital interface signal. The digital-to-analog converter 512 converts the digital signal to an analog signal and provides the analog signal to a decoder 514. The decoder 514 may be coupled or in communication with an I-frame capture module 516 that captures an I-frame of the analog signal. The I-frame capture module 516 may process the I-frame signal and routes the signal through the router 320 to a display 520. The display 520 may display the live channel signal 522 and the insertion material or clip 524.

The automation system 120 may also include an insertion module 530 used for inserting the insertion material into the channel stream. The insertion module 530 may also provide a signal to the I-frame capture module 516 so that both the inserted material and the channel signal may be provided and displayed on the display 520.

After the decoder and if insertion is performed at the insertion module 530, the channel signal may be multiplexed in the multiplexer 540. The multiplex signal is then provided to the encoder 330 described above. After the encoding at the encoder 330, the signal is ultimately passed to the uplink RF system 202 as described above in FIGS. 3A and 3B.

An authentication module 542 may also be provided to allow the remote monitor 326 to access the system from a remote location. The authentication module 542 may require a password or other identification to allow access to the system for monitoring or controlling various functions.

Figure 7:
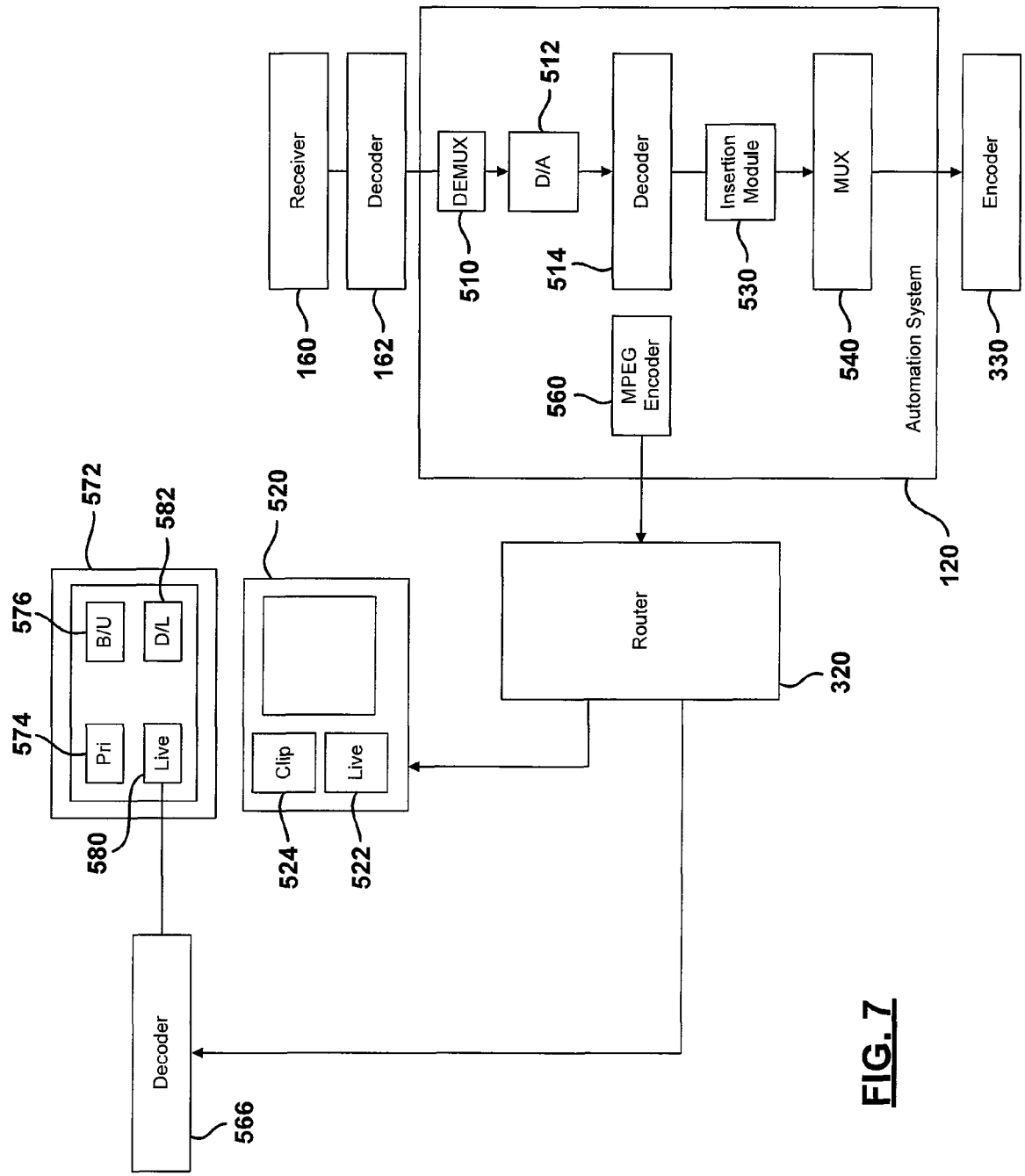
FIG. 7 is a schematic view of a first embodiment of monitoring a channel signal.

Referring now to FIG. 7, the automation system 120 may also be used to convert the channel signal to an MPEG encoded signal through the MPEG encoder 560. The MPEG encoder 560 replaces the I-frame capture module 516 illustrated in FIG. 6. Thus, the remaining portions of the circuitry act in a similar manner and thus will not be described further. The MPEG encoder 560 may MPEG encode the channel signals and the modified channel signals. A multicast address may be assigned to the signals and routed through the router 320. In a similar manner to that described above, the display 520 may be used to display both the channel signal and the modified channel signal on the display portions 522 and 524, respectively. The router 320 may route the signals to the decoder 566. The decoder 566 may provide the signals to a display 572 that includes a display which displays the signals from the primary automation system 574, the back-up automation system 576, the channel signal 580 and a downlinked signal corresponding to the channel signal at the downlink display 582. The display 572 may be part of the ABMS system.

Figure 8:
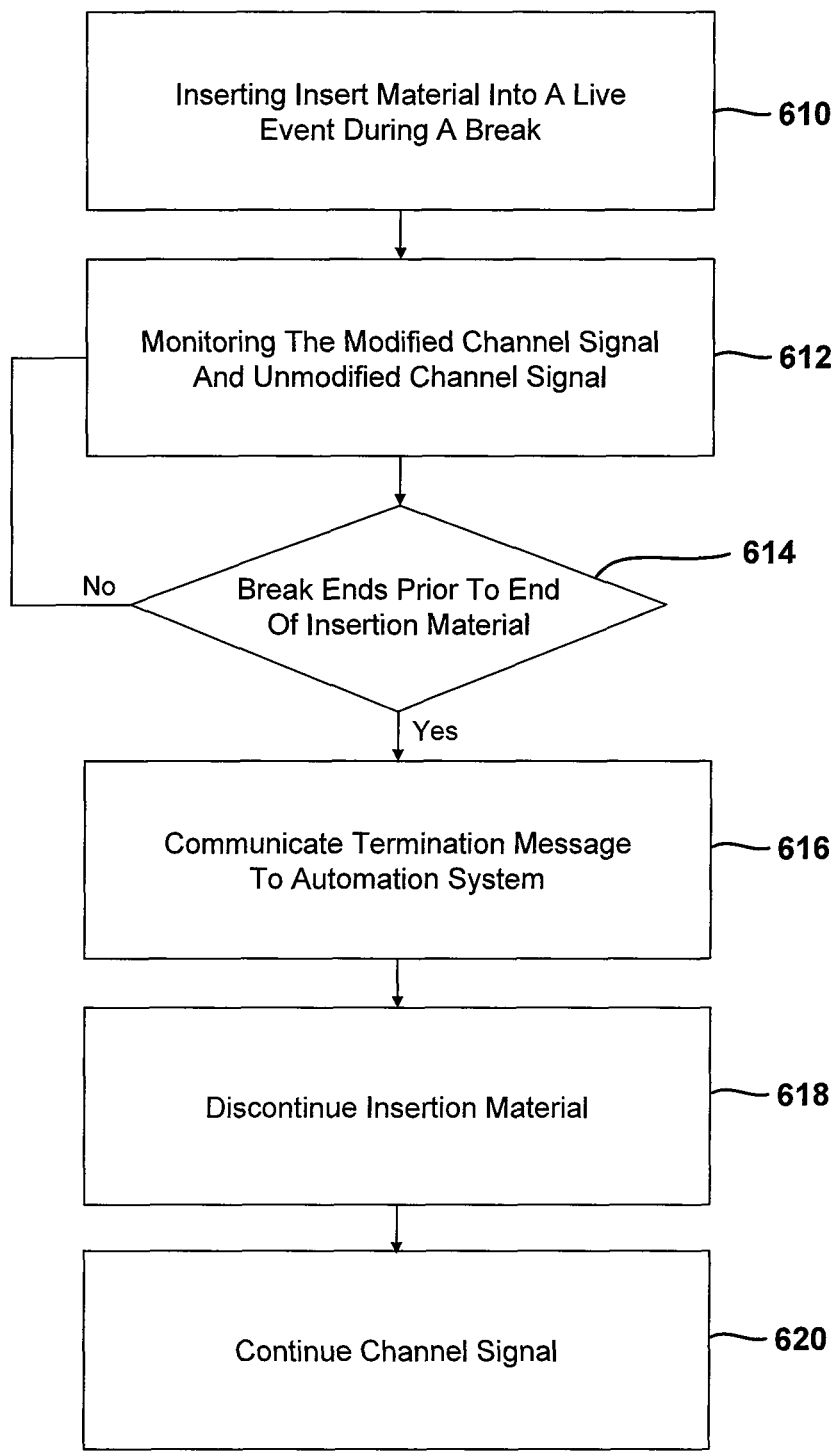
FIG. 8 is a flow chart of a method of monitoring a break and discontinuing insertion material according to one embodiment.

Referring now to FIG. 8, a method of monitoring a live signal and returning to the live signal should the event return early is set forth. This may be suitable when a station has a break for a live sporting event but returns prior to the end of the break to capture or display part of the event. This method may be used to avoid not broadcasting part of the event. In step 610, insert material may be inserted into a live event during a break. The break may be triggered by an SCTE 104 signal, a DPI signal or a GPI signal. However, the break may be manually inserted as well. Manual insertion may be likely for live events. In step 612, the modified content signal is broadcast over the air. In step 612, the modified channel signal and the unmodified channel signal may be monitored in step 612. If the break does not end prior to the insertion, step 612 continues to monitor the system. In step 614, if the break ends prior to the end of the insertion material, step 616 is performed which communicates a termination message to the automation system. This may be performed automatically using the ABMS system or the monitoring system. This may also be performed manually by selecting a button or the like on a control terminal under the control of a system operator. In step 618, the insertion material is discontinued. Thereafter, the channel signal or unmodified channel signal is communicated so that it is broadcast through the system in step 620.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   prior to storing insert material, receiving insert material from a provider external to a broadcast system;
   storing insert material in a content repository of the broadcast system;
   assigning an insert material identification to the insert material;
   generating an insertion schedule having an insertion time corresponding to the insert material identification;
   communicating the insertion schedule to an automation server of the broadcast system;
   retrieving the insert material from the content repository using the automation server based on the insertion schedule prior to the insertion time and storing the insert material in the automation server prior to the insertion time;
   communicating a content signal with a trigger;
   inserting the insert material from the automation server into the content signal in response to the trigger and the insertion time to form a modified content signal; and
   thereafter, broadcasting the modified content signal to a plurality of user devices from the broadcast system.

2. A method as recited in claim 1 wherein receiving insert material comprises receiving insert material at the broadcast system by tape, video disk, satellite transmission, over-the-air transmission or direct feed.

3. A method as recited in claim 1 wherein the insert material comprises a commercial or promotional material.

4. A method as recited in claim 1 wherein the insertion time corresponds to a trigger time window.

5. A method as recited in claim 1 wherein the trigger comprises an SCTE 104 trigger, digital program insertion trigger or a general purpose interface.

6. A method as recited in claim 1 wherein the trigger is in a vertical ancillary data portion of the content signal.

7. A method as recited in claim 1 wherein the insert material comprises MPEG material content.

8. A method as recited in claim 1 wherein prior to communicating the content signal, receiving the content signal and decoding the content signal.

9. A method as recited in claim 1 wherein decoding the content signal comprises decoding the content signal into an SDI signal.

10. A method as recited in claim 1 wherein communicating the content signal comprises communicating the content signal from the content repository.

11. A method as recited in claim 9 wherein the SDI signal comprises an HD SDI signal.

12. A method as recited in claim 9 further comprising demultiplexing the SDI signal prior to inserting the insert material to form a demultiplexed signal and thereafter converting the demultiplexed signal into a second SDI signal.

13. A method as recited in claim 9 wherein after inserting, encoding the SDI signal into an MPEG signal.

14. A system comprising:
   a content repository of a broadcast system storing insert material received from a provider external to the broadcast system;
   a scheduling system of the broadcast system assigning an insert material identification to the insert material and generating an insertion schedule having an insertion time corresponding to the insert material identification;
   an automation server of the broadcast system in communication with the scheduling system and receiving the insertion schedule, retrieving the insert material from the content repository based on the insertion schedule prior to the insertion time, storing the insert material therein prior to the insertion time, receiving a content signal with a trigger and inserting the insert material from the automation server into the content signal in response to the trigger and the insertion time to form a modified content signal; and
   a signal processing system of the broadcasting system broadcasting the modified content signal to a plurality of user devices.

15. A system as recited in claim 14 wherein the insert material comprises a commercial or promotional material.

16. A system as recited in claim 14 wherein the insertion time corresponds to a trigger time window.

17. A system as recited in claim 14 wherein the trigger comprises an SCTE 104 trigger, digital program insertion trigger or a general purpose interface.

18. A system as recited in claim 14 wherein the trigger is in a vertical ancillary data portion of the content signal.

19. A system as recited in claim 14 wherein the insert material comprises MPEG material content.

20. A system as recited in claim 14 further comprising a decoder decoding the content signal into a decode signal.

21. A system as recited in claim 14 wherein the automation server receives the content signal from the content repository.

22. A system as recited in claim 20 wherein the decoded signal comprises an SDI signal.

23. A system as recited in claim 22 further comprising a demultiplexer demultiplexing the SDI signal prior to inserting the insert material to form a demultiplexed signal.

24. A system as recited in claim 23 further comprising an encoder encoding the demultiplexed signal into an MPEG signal.

* * * * *